Oct. 16, 1934.  A. P. HAYWARD  1,977,385
REGULATING SYSTEM
Filed Sept. 10, 1932   2 Sheets-Sheet 1
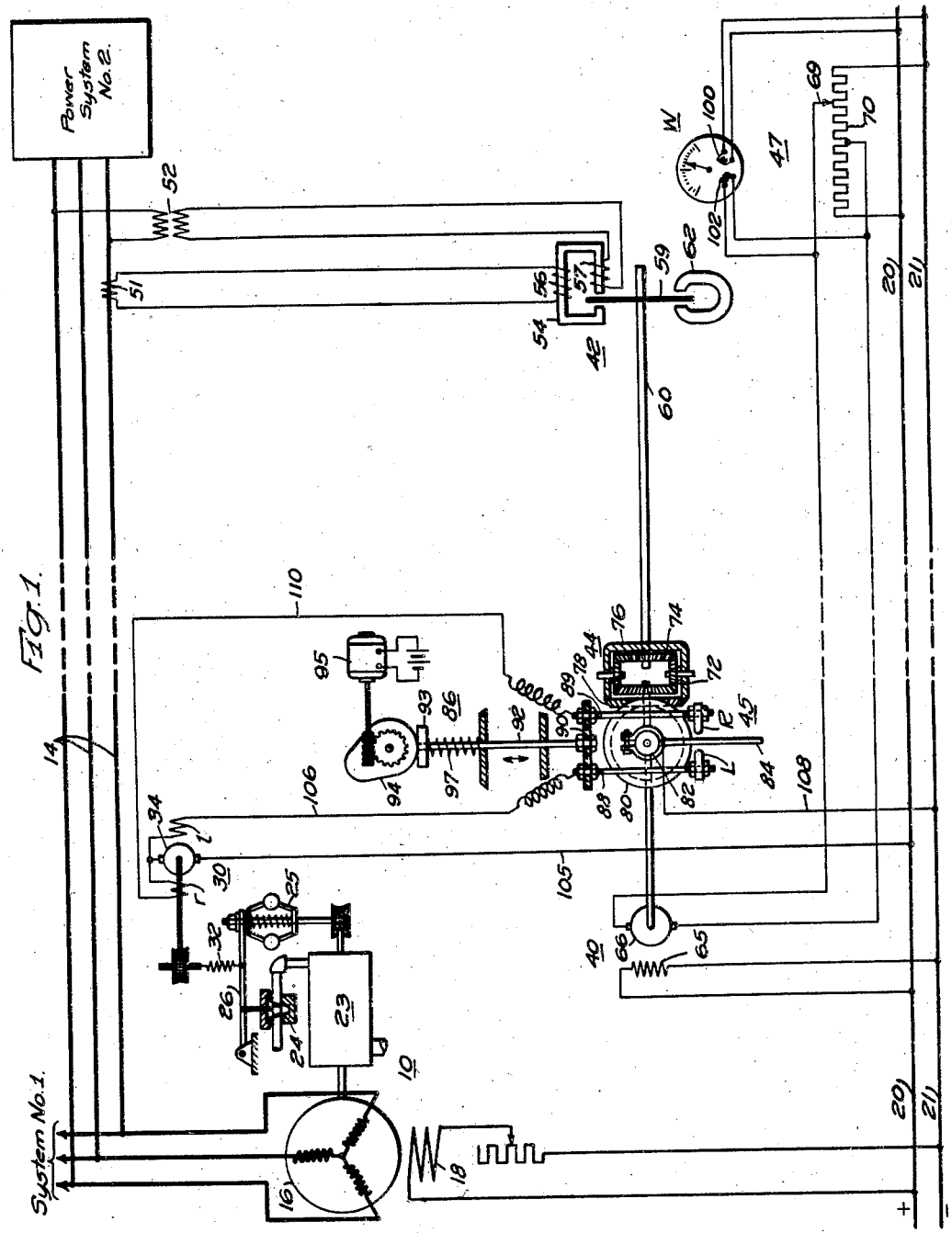

Oct. 16, 1934.  A. P. HAYWARD  1,977,385
REGULATING SYSTEM
Filed Sept. 10, 1932   2 Sheets-Sheet 2
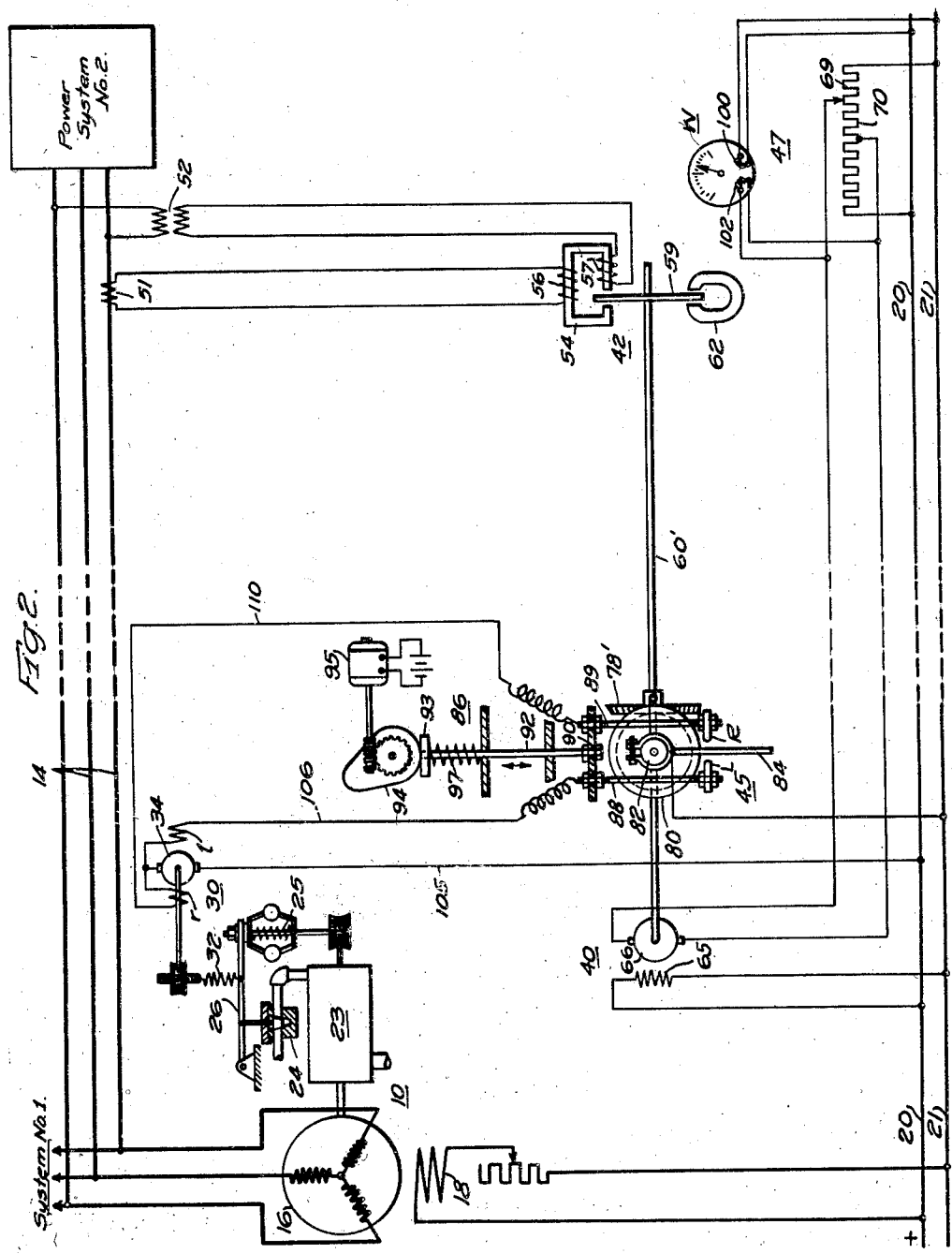
WITNESSES:
E. A. McCloskey
C. F. Bryant
INVENTOR
Arnold P. Hayward.
BY
Franklin E. Hardy
ATTORNEY Patented Oct. 16, 1934

1,977,385

UNITED STATES PATENT OFFICE 1,977,385

REGULATING SYSTEM

Arnold P. Hayward, Bellevue, Pa.

Application September 10, 1932, Serial No. 632,523

10 Claims. (Cl. 171—312)

My invention relates to regulating systems and it has particular relation to regulating systems which are especially adapted to control the flow of power between two interconnected power sources or systems.

In maintaining or regulating the interchange of power between two electrical systems, each of which may involve one or more generating sources, it has been customary in the past to utilize for the control of power-flow-adjusting means an influence which corresponds to an instantaneous reading of a watt meter connected to the tie line circuit. Frequently, however, it is desirable to integrate or average the power flow values over short periods of time before allowing them to effect an action tending to correct a deviation from the desired value in system power interchange, and in such cases the instantaneous reading method is inadequate.

Likewise, the rapid increase in the extensiveness and importance of present day power system interconnections has created a need for a load control system which may be adjusted from a remote location in order that the necessary control supervision may be effected from a central dispatching point or control center.

My invention is directed to an improved regulating system which possesses the desirable features above pointed out, together with other advantages to be particularized hereinafter.

An object of my invention is to provide a regulating system for controlling the flow of power between two interconnected systems which integrates or averages the flow being regulated in initiating corrective actions.

Another object of my invention is to provide a system of the type described in which the corrective action is caused to proceed in a step-by-step manner, and in which the duration of each corrective impulse is dependent upon the magnitude of integrated error in the regulated quantity.

A further object of my invention is to provide a regulating system of the type described in which recalibration or adjustment in the value of the regulated quantity, which it is desired to maintain constant, may be effected from a remote location.

My invention will best be understood through the following description of specific embodiments thereof when taken in conjunction with the accompanying drawings, in which Figure 1 is a diagrammatic view of apparatus and circuits arranged in accordance with one embodiment of my invention shown as being disposed to control the direction and magnitude of load carried by a tie line which serves to interconnect two power systems, and Fig. 2 is a diagrammatic representation of a second embodiment of my invention illustrated in an application similar to that shown in Fig. 1.

Referring to the drawings, and particularly to Fig. 1 thereof, two power systems, designated generally as systems No. 1 and No. 2, are represented as being interconnected by means of a tie line 14. As shown, the systems are of the three-phase alternating-current type; system No. 1 comprising a generating unit 10. As illustrated, this unit comprises a generator having armature windings 16 connected with the main power circuit conductors of system No. 1 and an exciting field winding 18 which is energized from any suitable source of direct current potential represented by conductors 20 and 21.

The generator is driven by a prime mover 23 of the motive fluid type having an input control valve 24, the opening of which is regulated by a speed responsive governing mechanism 25 which transmits control movements to a pivoted arm 26 by which the movable element of the valve is actuated.

A load adjusting motor 30 of the reversible type serves to adjust the tension of a governor-adjusting spring 32 in a well known manner to effect corresponding changes in the output of the generating unit, it being understood that in an alternating-current power system, the magnitude of power which a generating unit supplies is determined by the phase angle difference between the internal voltage of that unit and the voltage of the system to which it is connected. Thus, when the armature winding 34 of the load adjusting motor is energized from a suitable direct current source through field winding "$r$", the motor rotates in the load-raising direction while when energized through field winding "$l$" it rotates in the opposite or load-lowering direction.

Hence, in the case of the equipment illustrated in Fig. 1, when the governor of generating unit 10 of system No. 1 is so set as to cause this unit to run at a speed tending to exceed that corresponding to the frequency of power system No. 2, there will be a flow of power through tie line 14 from system 1 to system 2. Conversely, when the governing mechanism of generated unit 10 is so calibrated that load-consuming equipment (not shown), directly supplied by system No. 1, tends to more than consume the output of unit 10, there will be a power flow in the opposite direction or from system No. 2 to system No. 1 through the tie line.

Consequently, for purposes of explaining the operation of the regulating system of my invention, it may be assumed that the range of adjustment which may be effected by governor calibrated motor 30 is sufficient to change the power flow to tie line 14 from a given value in one direction through successively smaller values until it is reduced to zero and then cause the power flow to build up in the opposite direction to a given value.

It may here be pointed out that the system of my invention is in no way limited in its application to the specific arrangement of power system interconnection which has just been described, for, as will become evident, it is applicable to all situations in which it is desired to control the flow of power between two interconnected electrical devices or systems, the control mechanism being located either at the point of control or at a point remote therefrom.

The embodiment of my invention illustrated in Fig. 1 comprises two elements 40 and 42 which are connected through a differential mechanism 44 with contact making means 45 which serves to control the power-flow adjusting means, comprising the generating-unit-output-adjusting motor 30. As shown element 42 is an alternating-current motor that is energized in accordance with the flow of power through the tie line 14, and element 40 is illustrated as a direct-current motor the energization of which is controlled from a load setting station 47.

The motor 42 may be of any suitable type the speed of which is proportional to the magnitude of power flow through the tie line 14, from which it is energized through current and potential transformers 51 and 52. The motor 42 comprises a core member 54, and current and potential windings 56 and 57 which serve to set up a sweeping magnetic flux in a conducting disk element 59 that is mounted upon a shaft 60. A damping magnet 62 is associated with the rotatable disk element 59, and creates a constant magnetic field which exerts a counter torque upon the disk that is substantially proportional to its speed of rotation. It will be recognized that this structure is the same as that of induction type watthour meters, the operation of which is so well known as to require no further explanation.

The intensity and direction of the sweeping magnetic flux produced by the member 54 tends to set up rotation of the disk 59 in the direction of and proportional to the magnitude of power flow through tie line 14. Consequently, when the power flows from system No. 1 to system No. 2, element 42 will rotate in one direction, and when the power flows through the tie line from system No. 2 to system No. 1, element 42 will be rotated in the opposite direction, the speed of rotation in either instance being dependent upon the tie-line load.

The motor element 40 may be of any suitable type, the speed of which is a measure of the value of load desired, and is illustrated as a shunt-wound direct-current motor comprising a constantly energized field winding 65 and an armature winding 66. The energization of winding 66 is controlled from load-setting station 47 by moving a contact member 69, which is connected with one side of the winding, along a potentiometer resistor 70, the ends of which are connected with direct-current-energized conductors 20 and 21 and the midpoint of which is permanently joined with the other side of the motor armature, as shown.

When the contact member 69 engages with the midpoint of resistor 70, it will be seen that motor armature winding 66 receives no voltage whatever, while when the member is moved to the right of the midpoint, to some position such as is illustrated, the armature is acted upon by a voltage of one polarity, and when the contact member is moved to the left of the midpoint of the resistor, the polarity of the armature energizing voltage is reversed. The magnitude of this armature energizing voltage will also be seen to depend upon the position of the contact member 69, it being greatest when the member is at the end of the potentiometer resistor 70. Consequently, it will be evident that by moving the contact member 69 to the right, the speed of motor element 40 may be adjusted from zero to maximum in one direction while when the contact member 69 is moved to the left, the speed may similarly be adjusted from zero to maximum in the opposite direction.

Desired-load element 40 rotates a gear wheel 72 of differential mechanism 44, while actual-load element 42 is directly coupled with gear wheel 74 of the mechanism. When these two elements rotate at the same speed and in opposite directions, no movement of the central or frame portion 76 of the mechanism to which a bevel gear wheel 78 is attached will result. However, when a difference in speed of the two elements obtains a rotation of gear wheel 78 will result.

Gear wheel 78 engages with a second bevel gear wheel 80 upon a hub portion 82 of which is mounted a pointer element 84, the mounting being in the nature of a slip-clutch connection. Pointer 84 will thus tend to follow the rotative movements of gear wheel 80 until restrained, such as by contact members L and R positioned in cooperative relation therewith in the manner shown. Once the pointer has been moved into engagement with either of these members further rotation of gear wheel 80 merely effects a slipping of the hub portion 82 with respect to the pointer 84.

The pointer 84 and contact members L and R serve to complete energizing circuits for load-adjusting motor 30, the motor being rotated in the generating-unit-load-raising direction when the pointer is moved to the right to contact member R and the motor similarly being rotated in the load-lowering direction when the pointer moves to the left to contact member L.

The portion of the regulating system of my invention thus far described is capable of effecting a continuous corrective action in regulated quantity adjustment which, in certain situations, will be found to be adequate. However, in many applications, it is desired that the corrective action proceed in a step-by-step manner and that the duraton of the adjusting impulses vary in accordance with the magnitude of the error. To effect this result, an additional mechanism 86 is employed to move contact members L and R up and down along the length of pointer 84 at regular intervals.

These contact members are, in the system shown, supported by bolts 88 and 89 of conducting material which are attached to a member 90 of insulating material which is carried by a rod member 92 at the upper end of which a cap 93 is arranged to bear against a cam member 94 which is rotated by any suitable means, such as a constant speed motor 95. A compression spring 97 holds rod member 92 in the upward position shown, the force of which spring, however, is overcome when the raised portion of cam member 94 contacts with cap 93 to push rod 92 downwardly. Consequently, as cam 94 is rotated, contact members L and R move up and down along the length of pointer 84 with a frequency which may be varied or set to suit the response characteristics to step-by-step corrections of the particular load-adjusting means controlled. In practice, it will be found that a complete cycle of movement every two or three seconds is quite satisfactory for load adjusting devices of the types now utilized in combination with power systems.

When the contact members occupy a position near the mounting or pivot point of pointer 84, a greater movement of this pointer is required to establish contact than when the members occupy a position near the end of the pointer. Consequently, as the contact member moves downwardly it tends to restore the pointer to the mid position causing movement at the slip mounting on hub 82, and when upward movement of the member is effected, it will discontinue its contact with the pointer unless the pointer is continued to be rotated towards the member by the differential mechanism.

Therefore, in the event that the corrective impulse maintained during the downward travel of the contact member fails to re-establish the power interchange conditions to the desired value, the differential mechanism may continue to cause the pointer to bear against the contact member during its period of upward travel in which case there will be no interruption of corrective action between two successive downward movements of the contact members. However, when the corrective impulse suffices to effect the desired correction, the differential mechanism will no longer transmit engaging movement to the pointer and an interruption of the corrective action will be effected during the upward movement of the contact members. If, in the meantime, a further error has been integrated, the differential mechanism will again swing the pointer towards the contact member and the operation just described will be repeated.

It will be apparent, furthermore, that as the desired condition of regulated quantity is approached and the differential mechanism rotates the pointer 84 a lesser distance towards the co-operating contact member R or L during the upward return after each downward movement of such contact member, the magnitude of the corrective action will be progressively smaller because the contact member will have advanced downwardly a portion of the distance before again engaging the pointer, it ceasing entirely when such desired condition has been reached. This is a feature, as will be recognized, of prime importance in any regulating system in that it effectively eliminates the tendency for the regulator to hunt or overshoot in its corrective action.

In situations in which the load setting station is remotely located from the load adjusting apparatus, it is desirable that means be provided for informing an operator of the value of load or power interchange for which the regulating system may be set. In Fig. 1, such means are shown in the form of a wattmeter W installed at the load-setting station 47 and energized in the same manner as is desired load element 40. In the system shown, wattmeter W should be of the direct current type having a pair of windings 100 and 102, winding 100 being connected directly to the direct current energizing conductors 20 and 21, as is the field winding 65 of motor 40, and winding 102 being paralleled with the armature winding 66 of motor 40 to be energized by the same voltage. By properly calibrating the wattmeter so that when the motor armature voltage is zero, the pointer will occupy a mid position; it may be made to indicate the direction and speed of motor 40 from which indication, as will be seen, the direction and magnitude of power flow through tie line 14 can also, under proper conditions, be measured or indicated.

The details of the several elements which make up the regulating system of my invention having been generally described, attention may now be directed to the manner of operation of the complete system. For purposes of explanation, it may be assumed that it is desired to maintain a given value of power flow from power system No. 1 to power system No. 2 through tie line 14. At this particular value of power, motor element 42 will rotate at a given speed which may be exactly matched by that of motor element 40 by proper adjustment of the potentiometer at the load adjusting station 47.

As long as the tie line load remains at this desired value, no movement will be imparted by differential mechanism 44 to pointer 84, which, remaining in the neutral position shown, does not engage either of the cooperating contact members. For such a condition, therefore, no operation of generating unit load adjusting motor 30 will be effected.

In the event that the power flow through the tie line drops below the desired value, the speed of motor element 42 decreases and, since the speed of element 40 remains constant, the differential mechanism imparts a movement to pointer 84 causing it to move toward contact member L. Engagement of the pointer with this member completes an energizing circuit for load adjusting motor 30 which extends from the positive control conductor 20 through conductor 105, the armature and field windings 34 and 1 of the motor, conductor 106, contact rod 88, contact member L, pointer 84 and conductor 108 back to negative control conductor 21.

Thus energized, the motor 30 changes the tension of spring 32 in a manner to increase the opening of prime mover valve 24 and raise the output of generating unit 10, which action tends to restore the tie line load to its normal value. Assuming that cam member 94 is being rotated to effect a vertical oscillatory movement of the contact members, this load adjustment is effected in a step-by-step manner which has already been explained in detail.

The correction having been effected, the speed of element 42 is again raised to the value which matches that of element 40 and the load adjusting impulses are accordingly discontinued.

Similarly, in the event that the tie line load exceeds the desired value, the speed of element 42 is raised causing the differential mechanism 44 to move pointer 84 in the direction of contact member R. Engagement of the pointer and this contact member completes an energizing circuit for the motor 30 which extends from positive control conductor 20 through conductor 105, the armature and field windings 34 and "r" of motor 30, conductor 110, contact rod 89, contact member R, pointer 84 and conductor 108 back to negative control conductor 21.

Thus energized, motor 30 changes the tension of governor spring 32 in a manner to decrease the opening of prime mover valve 24 and lower the output of generating unit 10. This action tends to restore the tie line load back to the desired value. When the restoration is complete, the speed of element 42 again matches that of element 40 and further corrective actions are discontinued.

It has been seen that rotation reversal of desired-load element 40 may be effected by moving contact member 69 to the left of the midpoint of resistor 70 at the lower adjusting station 47. Such an adjustment is made when it is desired that the power flow through tie line 14 reverse, in which case the actual load element 42 will also reverse its direction of rotation, permitting its speed to be matched with that of element 40. It will be seen, therefore, that the particular system shown is capable of a very broad range of adjustment.

The use of a differential mechanism for coupling the desired load responsive and actual load responsive elements 40 and 42 which has been described may, in certain applications, be replaced by a different type of coupling, such as is illustrated in the system of Fig. 2. In Fig. 2, elements 40 and 42 are directly coupled by means of the shaft 60' to which is secured beveled gear wheel 78' which serves to control the position of pointer 84 in the same manner as has been explained in connection with the system of Fig. 1.

In this construction, it is the torque of elements 40 and 42 which must be balanced instead of their speeds. When the system is in a state of equilibrium, no rotation of the shaft 69' is effected, the torque set up in the actual-load responsive element 42 being exactly counter-balanced by the torque set up in desired-load element 40. Consequently, these elements, illustrated as being identical to those which have been described in connection with Fig. 1, may also be of a modified construction which is not adapted to continuous high speed rotation although it is preferable that the rotor elements thereof be capable of rotating through a relatively unrestricted range, particularly if the contact oscillating means 86 is employed in the system.

In the event that the contact members L and R are not provided with the vertical oscillating means, the range of rotation of elements 40 and 42 may be restricted to rather narrow limits permitting of their further simplification. It will be understood that such simplification, however, will entail a sacrifice in the integrating characteristics of the equipment.

In operation, the system shown in Fig. 2 is practically identical with that of Fig. 1 which has already been described, the only difference being, as has been mentioned, that when the load of tie line 14 deviates from a desired value for which the equipment has been set by a proper adjustment of the load setting apparatus 47 which corresponds to a given value of torque set up in motor element 40, the opposing torque produced by load responsive element 42 correspondingly deviates and allows a movement of shaft 60' which effects a rotation of the pointer 84 into engagement with one or the other of contact members L or R. This engagement completes the proper energizing circuits to cause load adjusting motor 30 to effect a correction in the tie line load. The correction having been effected, the torque of element 42 is restored to the balancing value and pointer 84 is accordingly returned to the neutral position shown.

It will be apparent that regulating systems possessing the novel features described are not limited in their application to interconnected power systems of the type with which they have been illustrated as they may also be applied to other situations in which it is desired to maintain quantities within given limits.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In a regulating system comprising quantity-adjusting means, the combination of a conducting-material pointer, means for producing a rotative movement dependent upon the deviation from a desired value of the quantity being regulated, a slip-clutch connection between said means and the pointer, contact members disposed in selectively engageable relation with said pointer, circuits comprising said contact members and pointer for controlling said quantity-adjusting means, and means for moving at regular intervals said contact members back and forth along the length of said pointer in planes parallel to the neutral position center line of the pointer.

2. Regulating equipment comprising in combination, an arm member, apparatus for producing a rotative movement dependent upon the deviation from a desired value of a quantity, a slip-clutch for connecting the arm member with said means, contact members disposed in selectively engageable relation with said member, and means for moving at regular intervals each of said contact members back and forth along the length of said arm in a plane which is parallel to the neutral-position center line of the arm.

3. A regulating system comprising, in combination, means for adjusting a quantity to be regulated, a motor energized in accordance with the value of said quantity, a second motor mechanically coupled with the first, means for energizing said second motor in accordance with the regulated quantity value which it is desired to maintain, a pivoted pointer member rotatably responsive to an unbalance in an output characteristic of said two motors, contact members disposed in selectively engageable relation with said pointer, means for moving at regular intervals the contact members back and forth along the length of said pointer in a plane which is parallel to the neutral-position center line of the pointer, and circuits comprising said contact members and pointer member for controlling said quantity adjusting means.

4. A tie-line load regulating system comprising, in combination, load-adjusting means for the tie line, a motor, means for causing the speed of said motor to vary in accordance with variations in value of the tie-line load, a second motor, means for adjusting the speed of said second motor to correspond to the desired value of the tie-line load, a differential mechanism acted upon by said two motors, a pointer member, a slip clutch device through which said pointer is actuated by said mechanism through said device, contact members disposed in engageable relation with said pointer, means for moving at regular intervals the contact members back and forth along the length of said pointer in a plane which is parallel to the neutral position center line of the pointer, and circuits comprising said contact members and pointer element for controlling said load-adjusting means.

5. A tie-line road regulating system comprising, in combination, load-adjusting means for the tie-line, a motor, means for causing the torque of said motor to vary with the actual value of tie-line load, a second motor, means for adjusting the torque of said second motor to correspond to the value of tie-line load which it is desired to maintain, a shaft for directly coupling said two motors, a pointer member, a slip-clutch device, said pointer being actuated by said shaft through said device, contact members disposed in engageable relation with said pointer, means for moving at regular intervals the contact members back and forth along the length of said pointer in a plane which is parallel to the neutral position center line of that member, and circuits comprising said contact members and pointer element for controlling said load-adjusting means.

6. A regulating system comprising in combination, means for adjusting a quantity to be regulated, motive means energized in accordance with the actual value of said quantity, a second motive means mechanically coupled with the first, a quantity-setting station for energizing said second motive means in accordance with the value of regulated quantity that it is desired to maintain, and contact-making means responsive to an unbalance in an output characteristic of said two motive means for controlling said quantity-adjusting means, said quantity-setting station comprising a device for adjusting the energization of said second motive means and an indicating device connected in parallel with said second motive means, said indicating device being calibrated in terms of the quantity which the regulating system is to maintain.

7. A regulating system comprising, in combination, means for adjusting a quantity to be regulated, a motor energized in accordance with the actual value of said quantity, a second motor energized in accordance with a desired value of said quantity, means for mechanically connecting together said two motors, a pointer, a slip-clutch device through which said pointer is actuated by the movement of said motor-connecting means, contact members disposed in engageable relation with said pointer, and circuits comprising said contact members and pointer for controlling said quantity-adjusting means.

8. A regulating system comprising, in combination, means for adjusting a quantity to be regulated, a motor, energizing means for causing said motor to rotate at a speed proportional to the magnitude of said quantity, a second motor, energizing means for causing said second motor to rotate at a speed corresponding to a desired value of the regulated quantity, a differential mechanism acted upon by said two motors, an arm member, a slip-clutch device through which said arm is actuated by said mechanism, contact members disposed in engageable relation with said arm, and circuits comprising said contact members and arm for controlling said quantity-adjusting means.

9. A regulating system comprising, in combination, means for adjusting a quantity to be regulated, a motor, energizing means for causing said motor to rotate at a speed proportional to the magnitude of said quantity, a second motor, energizing means for causing said second motor to rotate at a speed corresponding to a desired value of the regulated quantity, a differential mechanism acted upon by said two motors, an arm member, a slip-clutch device through which said arm is actuated by said mechanism, contact members disposed in engageable relation with said arm, means for moving at regular intervals the contact members back and forth along the length of said arm in a plane which is parallel to the neutral-position center line of the arm, and circuits comprising said contact members and arm for controlling said quantity-adjusting means.

10. A regulating system comprising, in combination, means for adjusting a quantity to be regulated, a motor, energizing means for causing said motor to produce a torque proportional to the magnitude of said quantity, a second motor, energizing means for causing said second motor to produce a torque corresponding to a desired value of the regulated quantity, a shaft for directly coupling said two motors in torque-opposing relation, an arm member, a slip-clutch device through which said arm is actuated by said shaft, contact members disposed in engageable relation with said arm, means for moving at regular intervals the contact members back and forth along the length of said arm in a plane which is parallel to the neutral-position center line of the arm, and circuits comprising said contact members and arm for controlling said quantity-actuating means.

ARNOLD P. HAYWARD.